(12) United States Patent
Lee et al.

(10) Patent No.: US 11,630,509 B2
(45) Date of Patent: Apr. 18, 2023

(54) DETERMINING USER INTENT BASED ON ATTENTION VALUES

(71) Applicant: Microsoft Technology Licensing, LLC, Redmond, WA (US)

(72) Inventors: Austin S. Lee, Seattle, WA (US); Anthony James Ambrus, Seattle, WA (US); Sheng Kai Tang, Redmond, WA (US); Keiichi Matsuda, Chigasaki (JP); Aleksandar Josic, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/119,683

(22) Filed: Dec. 11, 2020

(65) Prior Publication Data

US 2022/0187907 A1    Jun. 16, 2022

(51) Int. Cl.
*G06F 3/01* (2006.01)
*G06F 3/0481* (2022.01)

(52) U.S. Cl.
CPC .............. *G06F 3/013* (2013.01); *G06F 3/012* (2013.01); *G06F 3/017* (2013.01); *G06F 3/0481* (2013.01)

(58) Field of Classification Search
CPC .... G06K 9/2054; G06K 9/00979; G06N 3/04; A63F 13/533; G06T 11/60
See application file for complete search history.

(56) References Cited

U.S. PATENT DOCUMENTS

| | | | |
|---|---|---|---|
| 6,259,391 B1 * | 7/2001 | Pakravan | H03M 1/185 341/139 |
| 10,088,900 B2 * | 10/2018 | Kondo | G06F 3/011 |
| 10,209,785 B2 * | 2/2019 | Burns | G06F 3/04812 |
| 10,393,312 B2 * | 8/2019 | Pombo | F16M 11/2078 |
| 11,125,784 B2 * | 9/2021 | Hurwitz | G01R 19/12 |
| 11,126,850 B1 * | 9/2021 | Ichim | A63F 13/216 |
| 11,429,186 B2 * | 8/2022 | Lee | G06N 20/00 |

(Continued)

FOREIGN PATENT DOCUMENTS

EP       3014390 A1       5/2016

OTHER PUBLICATIONS

"International Search Report and Written Opinion Issued in PCT Application No. PCT/US21/058520", dated Feb. 23, 2022, 10 Pages.

*Primary Examiner* — William Lu
(74) *Attorney, Agent, or Firm* — Alleman Hall Creasman & Tuttle LLP (57) ABSTRACT

This disclosure relates to displaying a user interface for a computing device based upon a user intent determined via a spatial intent model. One example provides a computing device comprising a see-through display, a logic subsystem, and a storage subsystem. The storage subsystem comprises instructions executable by the logic machine to receive, via an eye-tracking sensor, eye tracking samples each corresponding to a gaze direction of a user, based at least on the eye tracking samples, determine a time-dependent attention value for a location in a field of view of the see-through display, based at least on the time-dependent attention value for the location, determine an intent of the user to interact with a user interface associated with the location that is at least partially hidden from a current view, and in response to determining the intent, display via the see-through display the user interface.

20 Claims, 10 Drawing Sheets

(56) References Cited

U.S. PATENT DOCUMENTS

| | | | |
|---|---|---|---|
| 2012/0154557 A1* | 6/2012 | Perez | G06F 3/017 |
| | | | 348/E13.001 |
| 2014/0267420 A1* | 9/2014 | Schowengerdt | G06T 19/006 |
| | | | 345/633 |
| 2014/0358962 A1* | 12/2014 | Wantland | G06F 16/90335 |
| | | | 707/769 |
| 2014/0380230 A1* | 12/2014 | Venable | G06F 3/013 |
| | | | 715/781 |
| 2015/0130703 A1* | 5/2015 | Ghajar | G06F 3/013 |
| | | | 345/156 |
| 2015/0212576 A1* | 7/2015 | Ambrus | G06F 3/04842 |
| | | | 345/156 |
| 2015/0261318 A1* | 9/2015 | Scavezze | G06F 3/017 |
| | | | 345/158 |
| 2016/0025981 A1* | 1/2016 | Burns | G02B 27/0101 |
| | | | 345/156 |
| 2016/0228771 A1* | 8/2016 | Watson | A61B 5/4023 |
| 2016/0262608 A1* | 9/2016 | Krueger | G16H 40/63 |
| 2017/0045941 A1* | 2/2017 | Tokubo | A63F 13/53 |
| 2017/0235360 A1* | 8/2017 | George-Svahn | G06F 3/03547 |
| | | | 345/173 |
| 2017/0354883 A1* | 12/2017 | Benedetto | G06T 11/60 |
| 2017/0358141 A1* | 12/2017 | Stafford | A63F 13/537 |
| 2018/0004285 A1* | 1/2018 | Castleman | H04L 65/602 |
| 2018/0007099 A1* | 1/2018 | Ein-Gil | G06F 9/468 |
| 2018/0300943 A1* | 10/2018 | Lindh | G06T 15/20 |
| 2018/0364048 A1* | 12/2018 | Cook | G01C 21/16 |
| 2019/0056856 A1* | 2/2019 | Simmons | G06F 16/34 |
| 2020/0082794 A1* | 3/2020 | Sanders | G06F 3/013 |
| 2021/0127220 A1* | 4/2021 | Parvaix | G06F 3/011 |
| 2021/0142086 A1* | 5/2021 | Berkovich | H04N 5/23229 |
| 2022/0153278 A1* | 5/2022 | Rosman | G06N 3/0454 |

* cited by examiner

DETERMINING USER INTENT BASED ON ATTENTION VALUES

BACKGROUND

A head-mounted display device (HMD) may display virtual objects superimposed onto a field of view of a real-world background. Some virtual objects may be displayed as being world-locked, in that the objects appear to exist in a reference frame of the real-world background as the HMD moves throughout the use environment. Other virtual objects may be displayed in a head-locked or display-locked manner, in which the displayed location is fixed relative to the HMD as the HMD moves through the use environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

This disclosure relates to displaying a user interface for a computing device based upon a user intent determined via a spatial intent model. One example provides a computing device comprising a see-through display, a logic subsystem, and a storage subsystem. The storage subsystem comprises instructions executable by the logic machine to receive, via an eye-tracking sensor, eye tracking samples each corresponding to a gaze direction of a user; based at least on the eye tracking samples, determine a time-dependent attention value for a location in a field of view of the see-through display; based at least on the time-dependent attention value for the location, determine an intent of the user to interact with a user interface associated with the location that is at least partially hidden from a current view; and in response to determining the intent, display via the see-through display the user interface.

DETAILED DESCRIPTION

In addition to displaying virtual application content, an augmented reality display device may display status indicators and/or other information via a heads-up display (HUD) user interface. Information displayed via such a HUD may include, for example, a current time, a remaining battery life, and notifications, among other information.

However, the display of such user interface elements in a virtual or augmented reality context can pose challenges. For example, on a see-through augmented-reality display device, one possible method of displaying such a HUD is to display the HUD as being positionally fixed relative to the see-through display (display-locked) of the device as the device moves relative to the real-world background view. However, persistently displaying a HUD in a display-locked manner may occlude aspects of a user's field of view. On the other hand, omitting display of such a HUD takes away immediately glanceable information that may be important to a user.

As one possible solution, a HUD may remain hidden until a user input to reveal the HUD is received. Gaze tracking is one example of a mechanism for manifesting an intent to interact with a hidden HUD. Eye gaze interactions offer more privacy and less likelihood of disturbing others in the use environment than some other input mechanisms, such as voice or hand gesture. However, detecting user intent from gaze tracking signals poses challenges. Natural human eye motion is saccadic, in that the eye naturally moves quickly between gaze locations, even when a person is visually focused on a particular gaze location. Due at least in part to such saccadic motion, it can be difficult to determine whether a user intends to reveal a hidden HUD based upon eye gaze samples. User intent may be more clearly discerned by use of a dwell period, such that a user can trigger the display of the HUD by gazing at a particular location on the HMD display for a predetermined interval of time. However, gazing for the predetermined dwell time may feel unnatural compared to ordinary saccadic eye motion.

Accordingly, examples are disclosed that relate to determining a user intent to interact with a dynamic HUD based on user attention as detected via a spatial intent model. Briefly, in one example, a display device may utilize an eye-tracking sensor to sample a user's gaze direction. The samples are provided to the spatial intent model, which computes time-dependent attention values for one or more locations in a use environment in a manner that accommodates saccadic eye motion. When a user gazes at a particular location on the see-through display sufficiently to manifest an intent to interact with a user interface as determined by the spatial intent model, user interface elements that were not previously displayed are revealed. In another example, a display device can track a user's head pose based on head-tracking data, and reveal HUD user interface elements in response to a user intent manifested by the head-tracking data. Upon reveal, a spatial intent model then may be used to determine a user's intent to interact with the displayed user interface elements. The examples provided herein may help to avoid false-positive triggers of the display of the HUD, and also false-negative misses of user intent compared to systems that utilize conventional gaze tracking input systems. In some examples, information in the HUD may be progressively displayed based on a progression of user intent signals.

Figure 1:
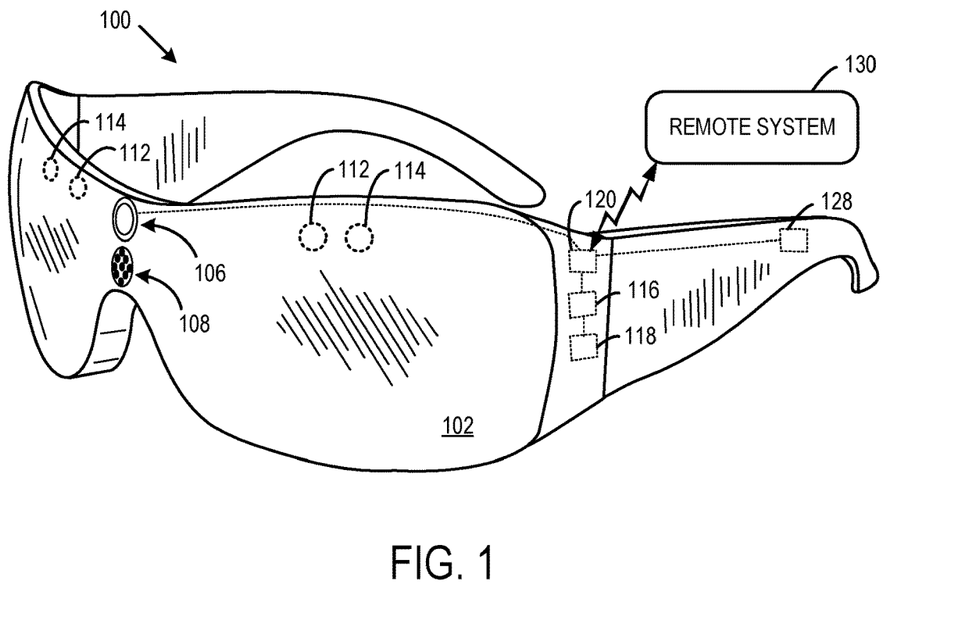
FIG. 1 shows an example computing device comprising an eye-tracking system.

FIG. 1 shows an example computing system in the form of a head-mounted display device 100 comprising an augmented reality (AR) display 102. The AR display 102 may comprise any suitable display mechanism (e.g., a scanned beam projector or microdisplay such as an LCoS microdisplay, with a waveguide-based or prism-based combiner, as examples) to display virtual imagery over a real-world background. Images displayed on AR display 102 may comprise stereoscopic images of virtual objects overlayed on the real-world scene such that the virtual objects appear to be present in the real-world scene. Display device 100 also comprises an outward-facing camera system, depicted schematically at 106, which may comprise one or more of a depth camera system (e.g., time-of-flight camera, structured light camera, or stereo camera arrangement), an intensity camera (RGB, grayscale, or infrared), and/or other suitable imaging device. Imagery from outward-facing camera system 106 can be used to form a map of an environment. As a more specific example, raw depth data from depth images of different regions of the use environment can be used to construct a point cloud depth representation of the use environment. This point cloud representation then may be used to form a surface reconstruction of the environment. In some examples, one or more classifiers (e.g., trained neural networks such as convolutional neural networks and/or other suitable machine learning function(s)) can be used to identify objects in the imagery, thereby allowing objects in the scene to be recognized and tagged as entities for interaction or other inputs. Such classification may be used to identify objects such as walls, floors, ceilings, doors, windows and other structural features and/or segments thereof; tables, chairs and other furniture; televisions, computers, phones, tables, and other devices; pictures, vases and other decorative objects; and/or any other suitable objects.

Outward-facing camera system 106 may also capture user hand motion, and thus may be used for gesture inputs. Display device 100 further may comprise an acoustic receiver 108, such as a microphone or microphone array, configured to receive audio inputs, such as speech inputs from the user.

Display device 100 also comprises an eye-tracking sensor to determine a gaze direction of an eye of a user. In some examples, the eye-tracking sensor for each eye comprises one or more eye tracking cameras, illustrated schematically at 112, and one or more glint light sources, illustrated schematically at 114. In one more specific example, four glint light sources and one image sensor may be used for each eye. Each glint light source 114 is configured to direct a beam of light (e.g. infrared light) toward the cornea of the eye. Image data from each eye tracking camera is analyzed to determine the location of a glint from each glint light source and a location of the pupil of the eye. The glint and pupil location data may then be used to determine a gaze direction, potentially in combination with suitable anatomical models related, for example, to eye geometry and/or head geometry. In the depicted example, the glint light source(s) 114 and corresponding eye tracking camera 112 are schematically depicted as being positioned above the eye. In other examples, the eye tracking camera and glint light sources may be positioned below the eye, to a side of the eye, or in any other suitable location.

Display device 100 further may comprise a global positioning system 116 and one or more motion sensors 118. Global positioning system 116 may be used to determine a user's location. Motion sensor data from motion sensor 118 may be used to track changes in the position and orientation of the display device 100 on the user's head and/or in the use environment. Display device 100 may also comprise an audio output device 128 comprising one or more speakers configured to output audio content to the user. In some example, a speaker may be positioned near each ear. In other examples, display device 100 may connect to external speakers, such as ear buds or headphones.

Display device 100 also comprises a controller 120 and a communication subsystem for communicating via a network with one or more remote computing systems 130. Controller 120 comprises, among other components, a logic subsystem and a storage subsystem that stores instructions executable by the logic subsystem to control the various functions of display device 100. Examples of such functions are described in more detail below.

Figure 2:
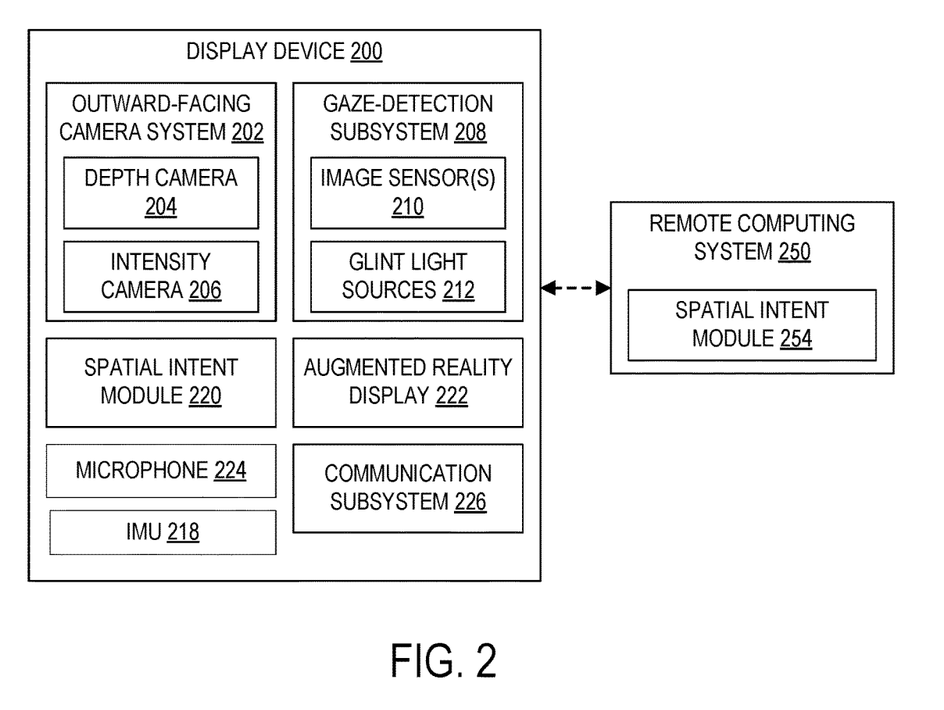
FIG. 2 shows a block diagram of an example computing system comprising an eye-tracking system and a spatial intent module.

FIG. 2 shows a block diagram of an example display device 200. Display device 100 is an example implementation of display device 200. As described above with regard to FIG. 1, display device 200 comprises an outward-facing camera system 202 including a depth camera 204 and/or intensity camera 206. Display device 200 also comprises gaze-detection subsystem 208. Gaze detection subsystem 208 comprises one or more glint light sources 212, and one or more image sensors 210 configured to capture an image of each eye of the user. In some examples, display device 200 further includes an inertial measurement unit (IMU) 218 for tracking a user's head gaze to detect an orientation and position of the display device 200. Display device 200 further comprises an augmented reality display 222 (see-through or video-based AR), optionally a microphone 224, and a communication subsystem 226 to communicate with one or more remote computing systems 250.

Display device 200 further comprises a spatial intent module 220 to help disambiguate potentially ambiguous gaze signals. Spatial intent module 220 may take the form of instructions stored in computer memory on display device 200 that are executable by one or more logic devices on display device 200. Further, spatial intent module 220 may be at least partially implemented on remote computing system 250, as indicated at 254.

As described above, ambiguous gaze signals arising from saccadic eye movement pose challenges for accurately determining a user's intended gaze input. To help disambiguate an intended gaze input from an unintended gaze input, spatial intent module 220 determines a time-dependent attention value for each of one or more gaze locations in the use environment based upon the gaze samples from an eye-tracking system, and updates the time-dependent attention values for the gaze locations over time. The gaze locations that are tracked by the spatial intent module 220 can represent physical locations in the real-world environment, locations of displayed virtual objects, and/or locations on the display, as examples. When the time-dependent attention value for a particular gaze location meets a predetermined threshold condition for that gaze location, an action associated with the gaze location can be triggered. For example, if a user gazes at a location associated with a hidden HUD for a user interface, and the time-dependent attention value for that location exceeds a predetermined threshold value (as one example of a threshold condition), display device 200 displays the HUD. By updating the time-dependent attention values as eye tracking samples are received, the spatial intent module 220 may provide insight into locations that are an intended focus of a user's attention, even where saccadic eye movement may at times shift the user's gaze to other locations.

Figure 3A:
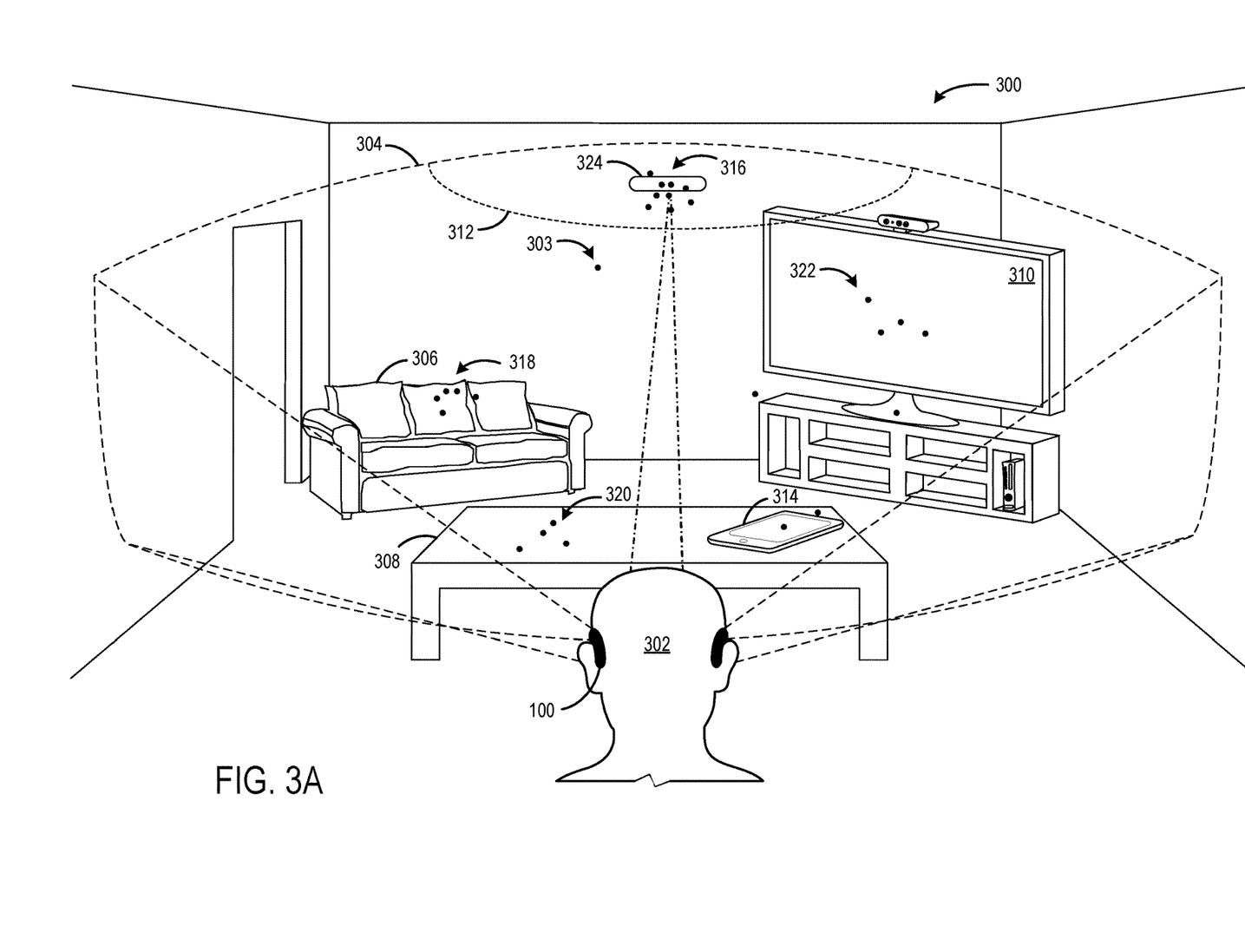
FIG. 3A schematically shows gaze directions of a user of a see-through display device over time, and illustrates an example user interface element displayed via the see-through display device.

FIG. 3A shows a scene 300 viewed by user 302 of display device 100, and shows a field of view 304 of display device 100. Dots represent eye-gaze locations as determined from eye gaze samples acquired by an eye-tracking system, an example of which is labeled at 303. Eye-gaze locations are shown at different locations within the field of view 304. As described in more detail below, display device 100 may determine one or more locations of interest that user 302 is gazing at based on the eye gaze samples. Some example locations of interest in FIG. 3A include a sofa 306, a table 308, a display 310, a location 312 on the see-through display that comprises a user interface element 324, and a tablet computing device 314.

Eye-tracking sensors 112 detect gaze directions for the user's eyes. Controller 120 of display device 100 may compare locations within the field of view 304 to the gaze directions to determine whether the gaze directions intersect any locations of interest in the scene. In FIG. 3A, user 302 is gazing towards location 312, as indicated by a plurality of gaze samples 316. Other recent gaze samples, indicated by dots, illustrate that the user's gaze also has been directed to other locations in the room, whether due to intent or to saccadic motion. For example, a plurality of gaze samples 318 were also detected toward sofa 306, a plurality of gaze samples 320 toward table 308, and a plurality of gaze samples 322 toward display 310.

As explained in more detail below, the spatial intent model updates a time-dependent attention value for each of one or more locations in the field of view, including location 312. The time-dependent attention value varies over time based upon how many gaze samples are detected for the location, balanced by a decay characteristic. In this manner, the time-dependent attention value models attention over time, and can allow a more accurate determination of intent as compared to an instantaneous location of a single gaze sample, while not involving an unnatural gaze dwell.

In the example of FIG. 3A, the computing device 100 determines the intent of a user to interact with the user interface element 324 based upon the time-dependent attention value for location 312 meeting a threshold condition. In response, a default appearance of user interface element 324 may change (e.g. in color, size, opacity, form, etc.) to indicate the determination of the user intent. In other examples, user interface element 324 may be fully hidden until a user intent is determined, and then transition into view based upon the user gazing sufficiently at location 312.

The change in appearance of the user interface element 324 provides the opportunity for a user to confirm the intent before displaying more user interface elements. In some examples, the user's intent to interact with the user interface element 324 can be confirmed by the user continuing to gaze primarily at the location 312 (while allowing for additional saccadic eye motions via the spatial intent model). In other examples, the user may confirm their intent using a hand gesture (e.g. swipe, pinch gesture), a voice command, a head gesture (e.g. head nod), a facial gesture, eye blinks, and/or any other suitable user input. In yet further examples, such a confirmation may be omitted.

Figure 3B:
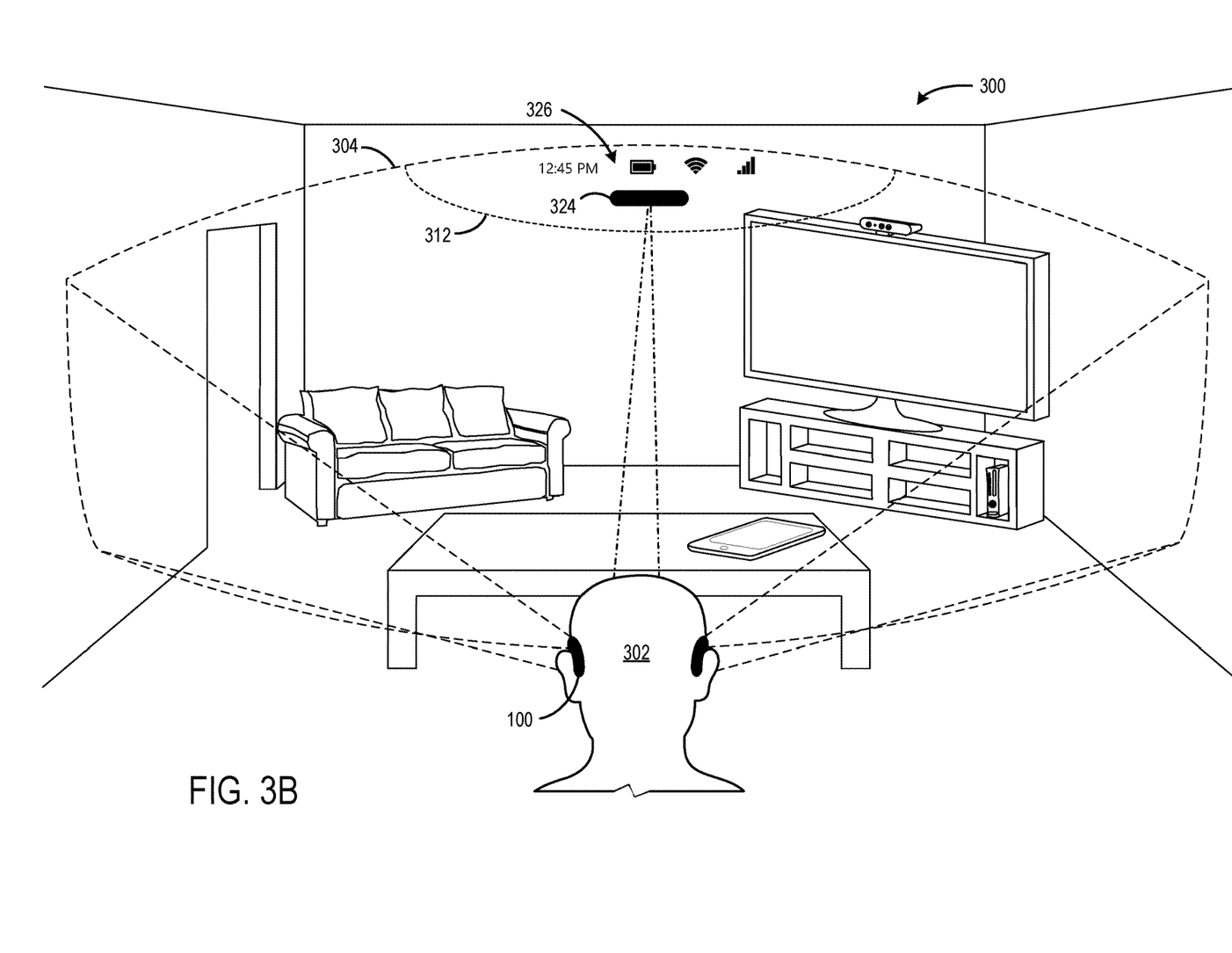
FIG. 3B illustrates the display of additional user interface elements in response to determining an intent of the user of FIG. 3A to interact with the example user interface element.

Next referring to FIG. 3B, upon this additional manifestation of user intent to interact with the user interface element 324, a hidden HUD 326 is displayed. User interface element 324 has changed in position to a location lower within the field of view 304 and in appearance to be less transparent. Further, the HUD 326 displays a current time, and icons representing a remaining battery life and wireless network signal strengths. By triggering the display of the HUD 326 via gaze, the HUD 326 does not occlude the user's view unless the user's possible intent to view the HUD is sufficiently manifested.

The spatial intent model may determine time-dependent attention values representative of a user's attention to different locations via a mathematical model such as a leaky integrator. In such an example, a gaze sample with a direction that intersects a location having a time-dependent attention value is treated as an input into the leaky integrator for that location, and the leaky integrator integrates the input according to a mathematical function. Further, the attention value for each entity "leaks," or decays, over time. As such, when a user gazes towards a location, the time-dependent attention value for the location increases with time. Likewise, when the user looks away from the location, the time-dependent attention value decreases. The time-dependent attention value for a location may asymptotically increase to a maximum value based on the rate of the leak in some examples. In various examples, the leaky integrator may comprise a first-order low-pass filter, a first-order differential equation, a higher-order differential equation, or other suitable mathematical function. As a more specific example, a leaky integrator function may comprise a differential equation in the form of $dx/dt=-Ax+C$, where C is the input and A is a rate constant representing the time constant for the leak. As such, the time-dependent attention value $x_n(t)$ for location n during a time period of constant input may take the form of $x_n(t)=ke^{-At}+x_{n,0}$, where k is a constant and $x_{n,0}$ is the time-dependent attention value of entity n at time t=0. If the input changes at a future time, the equation for the time-dependent attention value may take a similar form, but with different constants. In other examples (e.g., higher-order differential equations), the rate constant A may be a function of time t, attention value $x_n$, attention value $x_m$ for a different location m, number of locations, and/or other factors. In other examples, the leaky integrator function may comprise a different form.

Figure 4:
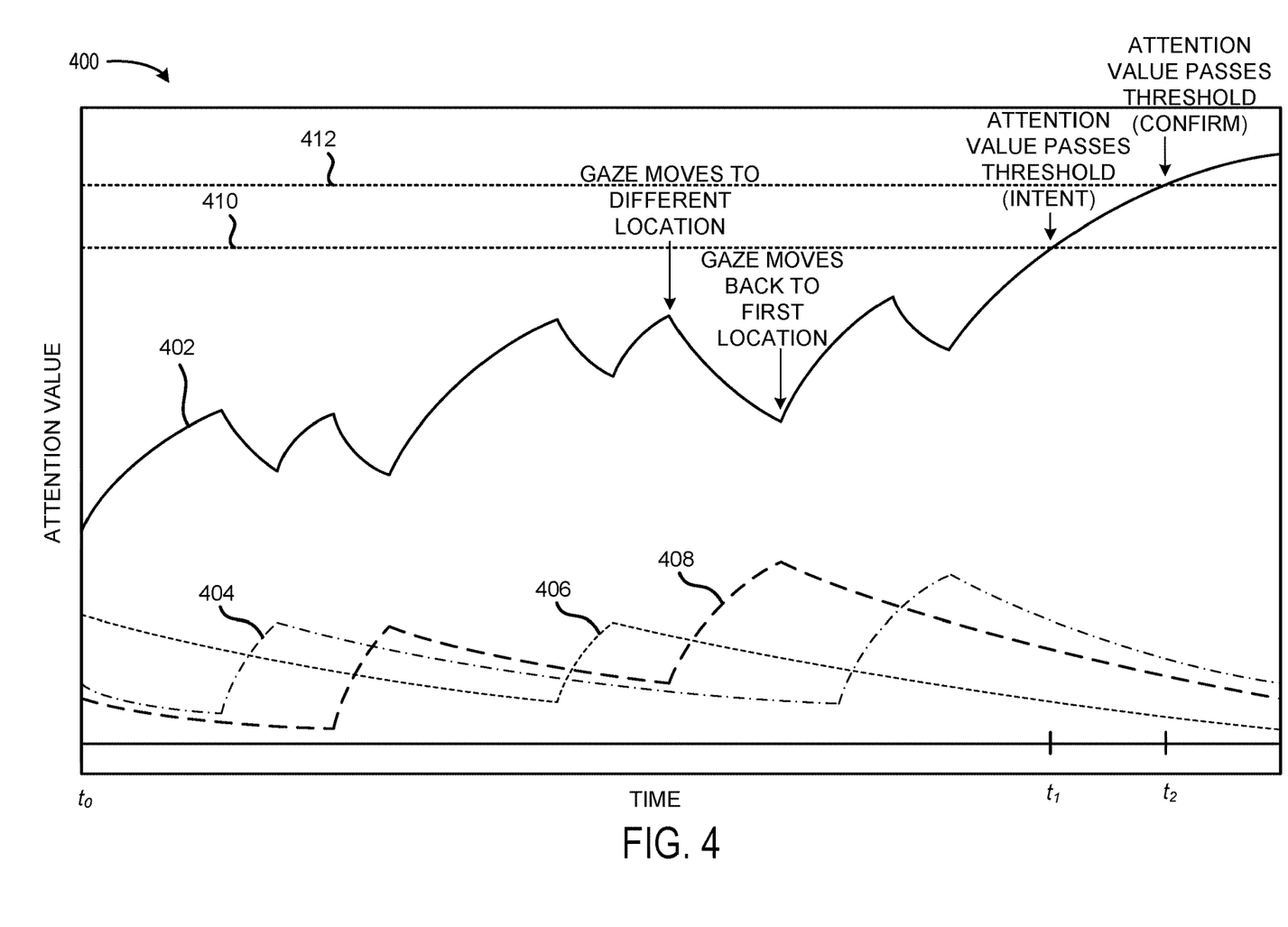
FIG. 4 shows a graph depicting example attention values as a function of time for a plurality of locations at which the user gazed in FIGS. 3A and 3B.

FIG. 4 shows a graph 400 of example time-dependent attention values corresponding to a user's gaze locations in FIG. 3A. In this example, the time-dependent attention values are calculated via a leaky integrator in the form of a first order differential equation. Time-dependent attention value 402 models the user's attention to location 312, for example. Likewise, time-dependent attention values 404, 406, and 408 model the attention respectively to sofa 306, table 308, and display 310. At time $t_0$, the user is gazing towards location 312 and attention value 402 is increasing. The rate of increase may slow as the attention value increases. At a later time, the user looks at a different location and attention value 402 begins to decrease (leak) while the attention value for the different location begins to increase. When the user gazes back towards location 312, attention value 402 increases again.

As mentioned above, when the time-dependent attention value for a location meets a threshold condition, the controller 120 of display device 100 may determine a user intent associated with that location. In FIG. 4, at time $t_1$, the time-dependent attention value 402 for location 312 surpasses a first threshold value 410, which indicates a user intent to interact with a user interface associated with location 312. In this example, at time t₁, controller 120 displays a change in appearance of user interface element 324 from a more transparent form to a less transparent form, as described above. In other examples, another suitable response may be displayed. At time t₂, the time-dependent attention value 402 for location 312 surpasses a second threshold value 412, which indicates a confirmation of the user intent. As a result, controller 120 displays additional user interface elements 326. In other examples, a single threshold may be utilized, and the progressive intent recognition/confirmation of FIG. 4 may be reduced to a same step.

Figure 5:
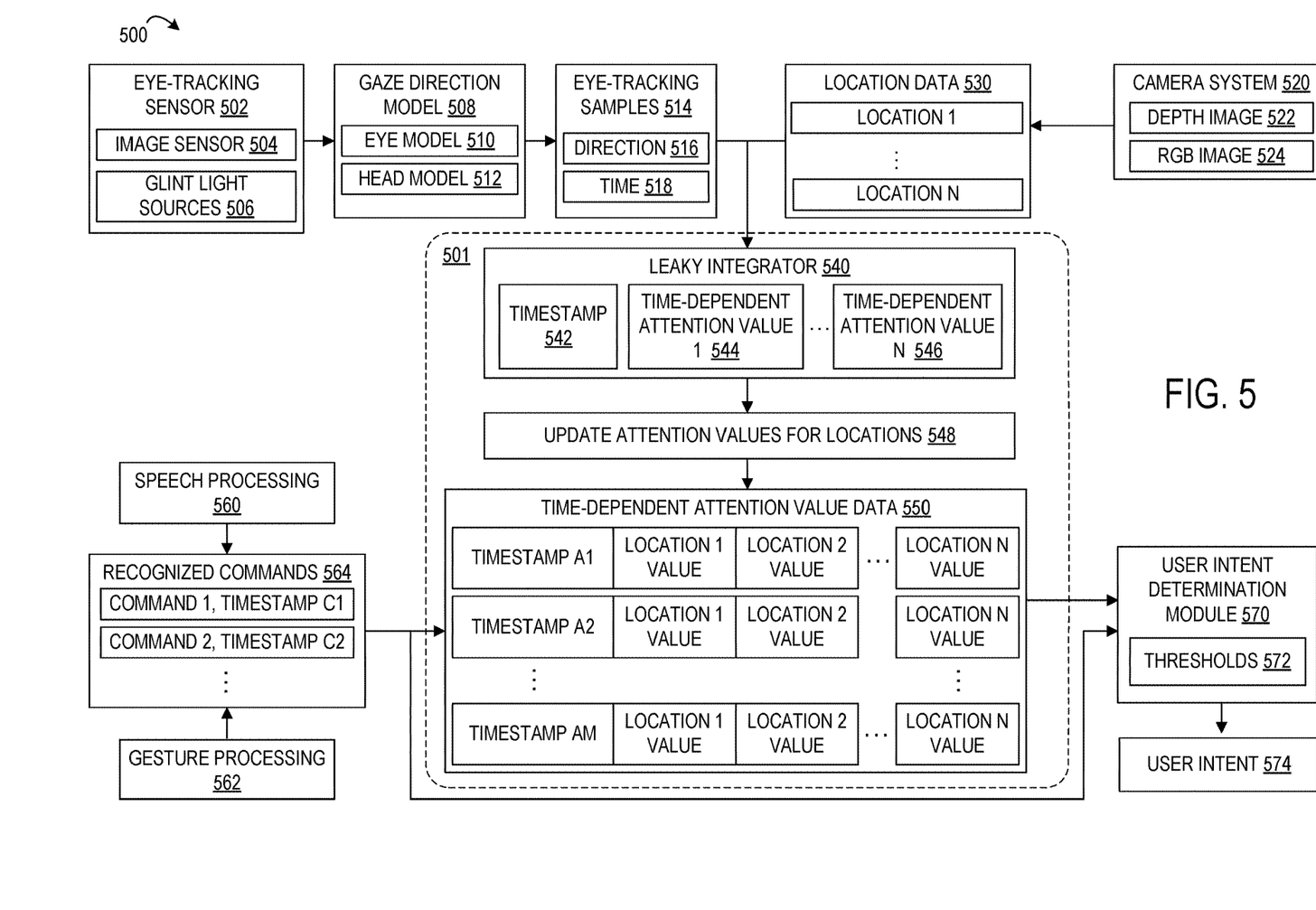
FIG. 5 shows a block diagram of an example system for associating a command with a gaze location using a spatial intent model.

FIG. 5 schematically shows a system 500 for determining time-dependent attention values for gaze locations that utilizes an example spatial intent model 501. The processing pipeline may be implemented on any suitable computing system, such as display device 100 (via controller 120), display device 200, and/or remote computing system 250, as examples.

System 500 comprises a gaze pipeline and one or more user input pipelines. In the gaze pipeline, eye-tracking sensor 502 outputs eye tracking signals to gaze direction model 508. Eye-tracking sensor 502 comprises an image sensor 504 and glint light sources 506. Based on the eye tracking signals, gaze direction model 508 determines a gaze direction of the user. Gaze direction model 508 may employ an eye model 510 and/or a head model 512 for the determination of gaze direction. With this information, the computing system (e.g., display device 100) can detect whether the gaze direction of an eye tracking sample intersects any locations of interest. Where the gaze lines do intersect locations of interest, the corresponding eye tracking samples 514 are input into leaky integrator 540.

System 500 further comprises location data 530 related to locations 1-N within a field of view of the system display. In the depicted example, camera system 520 images a scene via depth camera 522 and/or RGB camera 524. Image data comprising depth images and/or RGB images may be processed to determine various locations of interest in a scene, such as entities identified in the scene using object recognition. Additionally, locations may be predefined regions in the field of view of the system display, e.g. as provided by a software developer for system 500, and/or locations at which virtual objects are displayed (e.g. location 312 and user interface element 324 in FIG. 3A).

Based on a comparison of eye tracking samples 514 and location data 530, leaky integrator 540 assigns eye tracking samples to corresponding locations and updates time-dependent attention values for each location 1-N (indicated at 544 and 546). The attention values for each location as updated can be stored with timestamps 542 corresponding to a most recent eye tracking sample. For example, if a gaze direction 516 at a time 518 of an eye-tracking sample corresponds to location 1, the leaky integrator may determine a positive input signal for location 1 and a zero input signal for other locations at time 518.

After determining updated attention values 548, the updated attention values and corresponding timestamps are stored in a data structure for time-dependent attention value data 550, which also can store a number of previously determined time-dependent attention values. In some examples, the stored time-dependent attention value data 550 may be used to match additional user inputs with the time-dependent attention values based upon a timestamp for the user input. For example, user inputs to system 500 may comprise user speech inputs and/or user gesture inputs, as examples. Thus, a speech processing system 560 may output recognized commands from speech inputs received at a microphone, and a gesture processing system 562 may output recognized gesture commands. Recognized commands 564 may include intent confirming commands, as described above. The recorded timestamp for a recognized command may be compared to time-dependent attention value data 550 to link an intent determined based on an eye gaze determine if the user has confirmed an intent to perform an action associated with a location. In some examples, a timestamp for a recognized command may be compared to timestamps 542 for time-dependent attention values to determine a location with which to associate the command. Recognized commands 564, attention value data 550, and location data 530 can be input into a user intent determination module 570, which can apply one or more threshold conditions 572 to determine user intent 574. The user intent determination module 570 may take any suitable form. In some examples, the user intent determination module 570 may simply compare time-dependent values to thresholds. In other examples, the user intent determination module 570 may utilize a trained machine learning function that receives time-dependent attention values for locations and recognized commands 564 as inputs, and outputs a probability that a user intends to interact with a user interface. Any suitable machine learning function can be used in such examples, including but not limited to neural networks, support vector machines, random decision forests, and other types of classifiers. In such examples, a probability threshold may be applied as a threshold condition.

As mentioned above, additional user interface elements may be progressively displayed based on a progression in user intent. FIGS. 6-10 illustrate examples in which a user interface is progressively revealed. In some examples, each progressively expanded user interface may be shown in response to a time-dependent attention value for the displayed user interface meeting a threshold condition, for example. Further, in some examples, each individual user interface element in a displayed user interface may have its own associated time-dependent attention value, and each user interface element may be selected for further expansion based upon a threshold condition.

Figure 6:
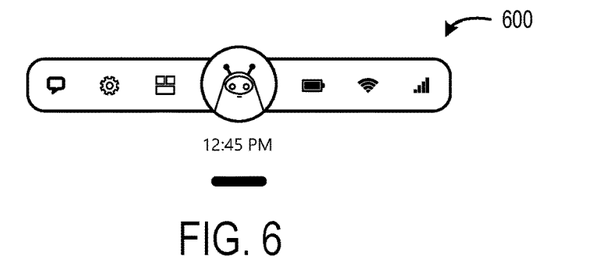
FIGS. 6-8 show example scenarios in which additional user interface elements are progressively revealed based on user intent.
Figure 7:
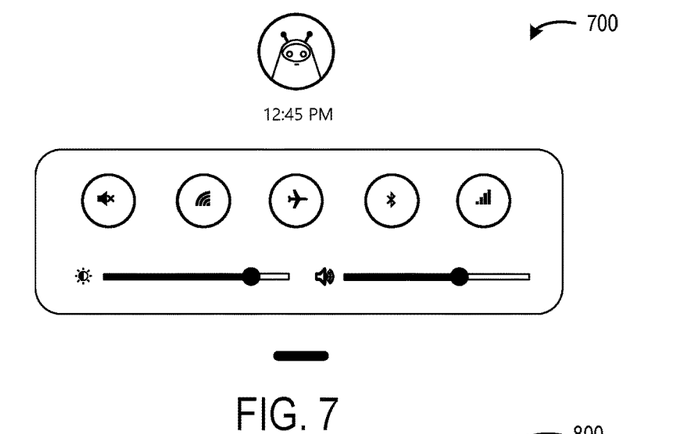
Figure 8:
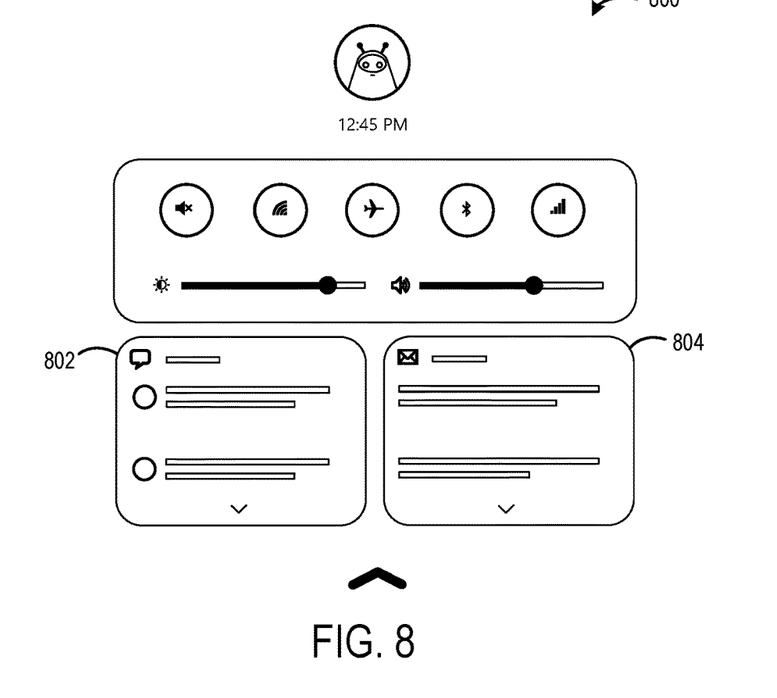

FIG. 6 shows an example user interface 600 in which the HUD 326 of FIG. 3B is expanded further to reveal icons in addition to the status icons shown in FIG. 3B. FIG. 7 shows an example user interface 700 in which user interface 600 is expanded yet further, revealing control icons that enable user interface actions. User interface 700 may enable a user to quickly glance at an icon for an application to reveal associated application information, as well as to toggle settings on or off and/or adjust sliders. FIG. 8 shows another example user interface 800 that can expand from user interface 700 upon further gaze interaction. In this example, user interface 700 is expanded to illustrate notification user interfaces 802 and 804. Thus at each progressive level of interaction, the user interface shows more detailed information. Further, by revealing this information progressively, an augmented reality display device avoids occluding a view of a real-world background unless a user intent to interact with the user interface is manifested.

Figure 9:
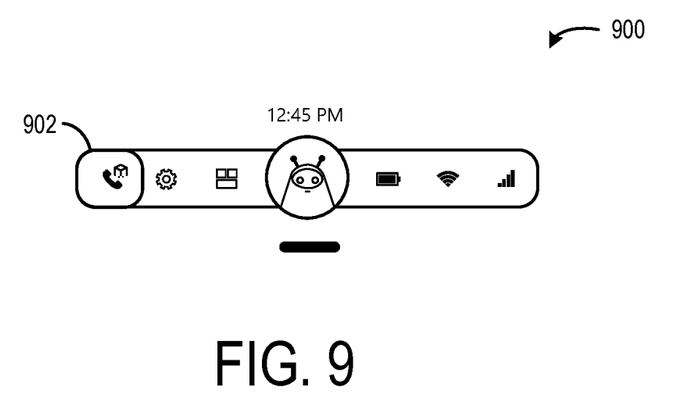
FIG. 9 shows another example user interface.
Figure 10:
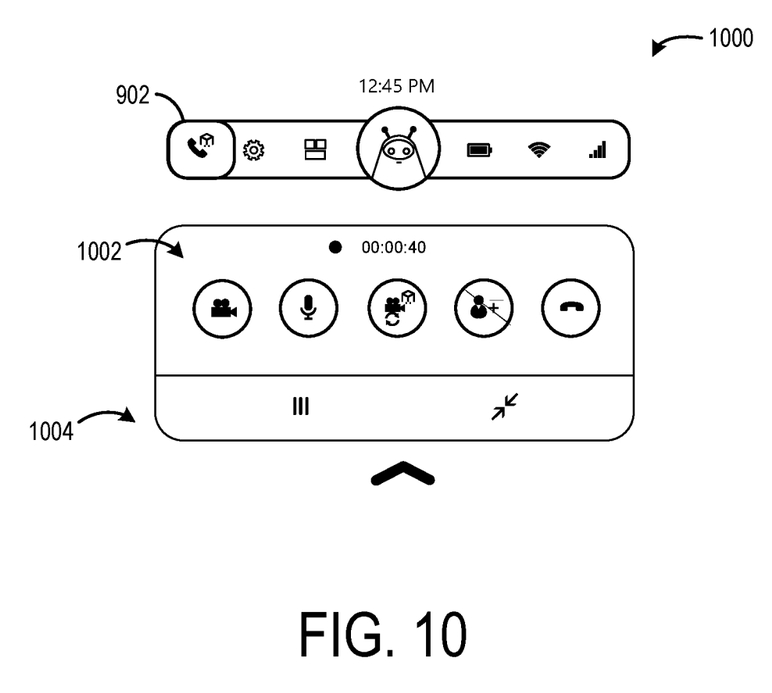
FIG. 10 shows examples of additional user interface elements displayed in response to selection of a user interface element of FIG. 9.

FIGS. 9 and 10 illustrate an example of expansion of a user interface element associated with a particular application. First, FIG. 9 shows an example user interface 900 displaying multiple user interface elements as icons. As mentioned above, each icon may have its own associated time-dependent attention value that is tracked using a spatial intent model. FIG. 10 shows an example user interface 1000 having application-specific controls shown after user selection of user interface element 902, e.g. by the time-dependent attention value for user interface element 902 meeting a threshold condition (which may be the same or different as threshold conditions used for other user interface interactions). In this example, the user has selected user interface element 902 to make a call. During the call, additional user interface information 1002 specific to the context of the call is shown in user interface 1000. Further, the user interface also comprises additional system level controls 1004, e.g. to enable the user to exit to a home screen or close a current menu (e.g. to revert to a previous user interface prior to expansion).

Although described in the context of a head-mounted display device, the above described examples may be utilized in any other suitable augmented reality display device, such vehicles, windows, billboards, etc.

Figure 11:
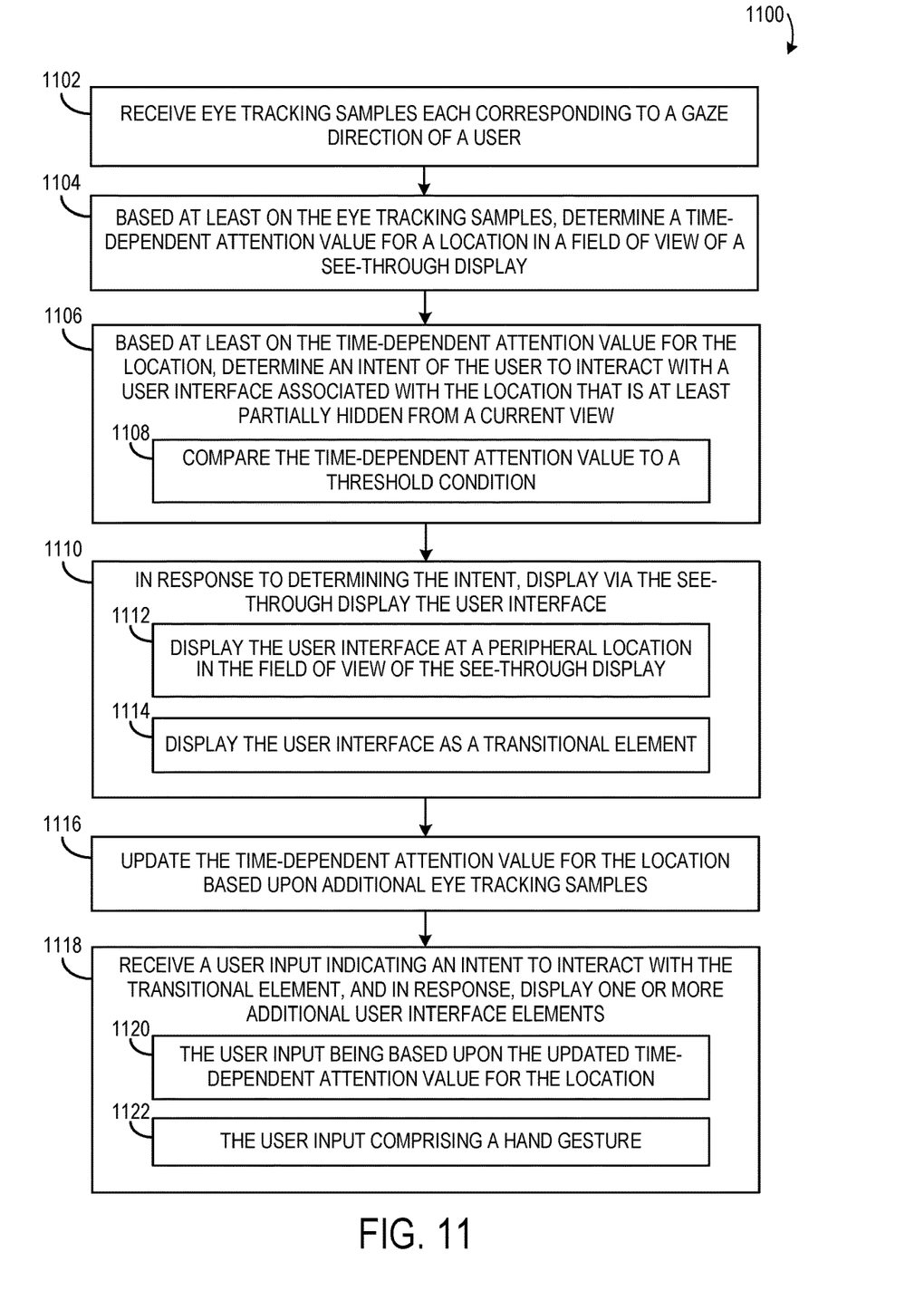
FIG. 11 shows a flow diagram depicting an example method of determining a user intent to interact with a user interface.

FIG. 11 shows an example method 1100 of determining a user intent to interact with a user interface based on eye gaze using a spatial intent model. Method 1100 may be performed by devices 100 and 200, as examples. Further, one or more processes may be performed by a remote computing system, such as a cloud-based server (e.g. remote computing system 250). Method 1100 includes, at 1102, receiving eye tracking samples each corresponding to a gaze direction of a user. At 1104, method 1100 includes, based at least on the eye tracking samples, determining a time-dependent attention value for a location in a field of view of a see-through display. As described above, a spatial intent model (e.g. spatial intent model 501) may be used to determine time-dependent attention values for various locations within a scene. The time-dependent attention values may be determined using a leaky integrator, for example.

Method 1100 further includes, at 1106, based at least on the time-dependent attention value for the location, determining an intent of the user to interact with a user interface associated with the location that is at least partially hidden from a current view. At 1108, such a determination may be made by comparing the time-dependent attention value to a threshold condition, whether by a simple comparison, using a more complex function (e.g. a trained machine learning function), or in any other suitable manner. In some examples, a user interface may remain hidden from view until a user intent is determined. In other examples, an initial, less conspicuous user interface element may be displayed by default, such as a grab bar (e.g. user interface element 324), which may progressively transition to reveal more of the user interface based on user intent.

At 1010, method 1100 includes, in response to determining the intent, displaying via the see-through display the user interface. In some examples, the user interface may be displayed at a peripheral location in the field of view, as shown at 1112. While a user interface is shown in examples FIGS. 3A and 3B as being near a top of the field of view, it will be understood that a user interface may also be revealed at a side, bottom, or any other suitable location within the field of view. As also described above, the user interface may be displayed as a transitional element, at 1114. The transitional element may transition in appearance in any suitable manner to indicate the determination of user intent.

At 1116, method 1100 includes updating the time-dependent attention value for the location based upon additional eye tracking samples. Method 1100 further includes, at 1118, receiving a user input indicating a further intent to interact with the user interface, and in response, display one or more additional user interface elements. The user input indicating the further intent may be based upon the updated time-dependent attention value for the location in some examples, as 1120. In some examples, to make the determination of the further intent, the updated time-dependent attention value may be compared to another threshold condition. In other examples, the user input indicating the further intent may include a hand gesture, such as a pinch or swipe gesture, that when detected causes the user interface to expand. In these manners, a user may confirm the initial user intent to interact with the user interface. FIGS. 6-10 above show examples of expanded views of a user interface that may be displayed in response to such a determination of further user intent. Additional user interface elements may be revealed in a progressive manner based on further user interaction, as described above. In other examples, such progression may be omitted.

Figure 12:
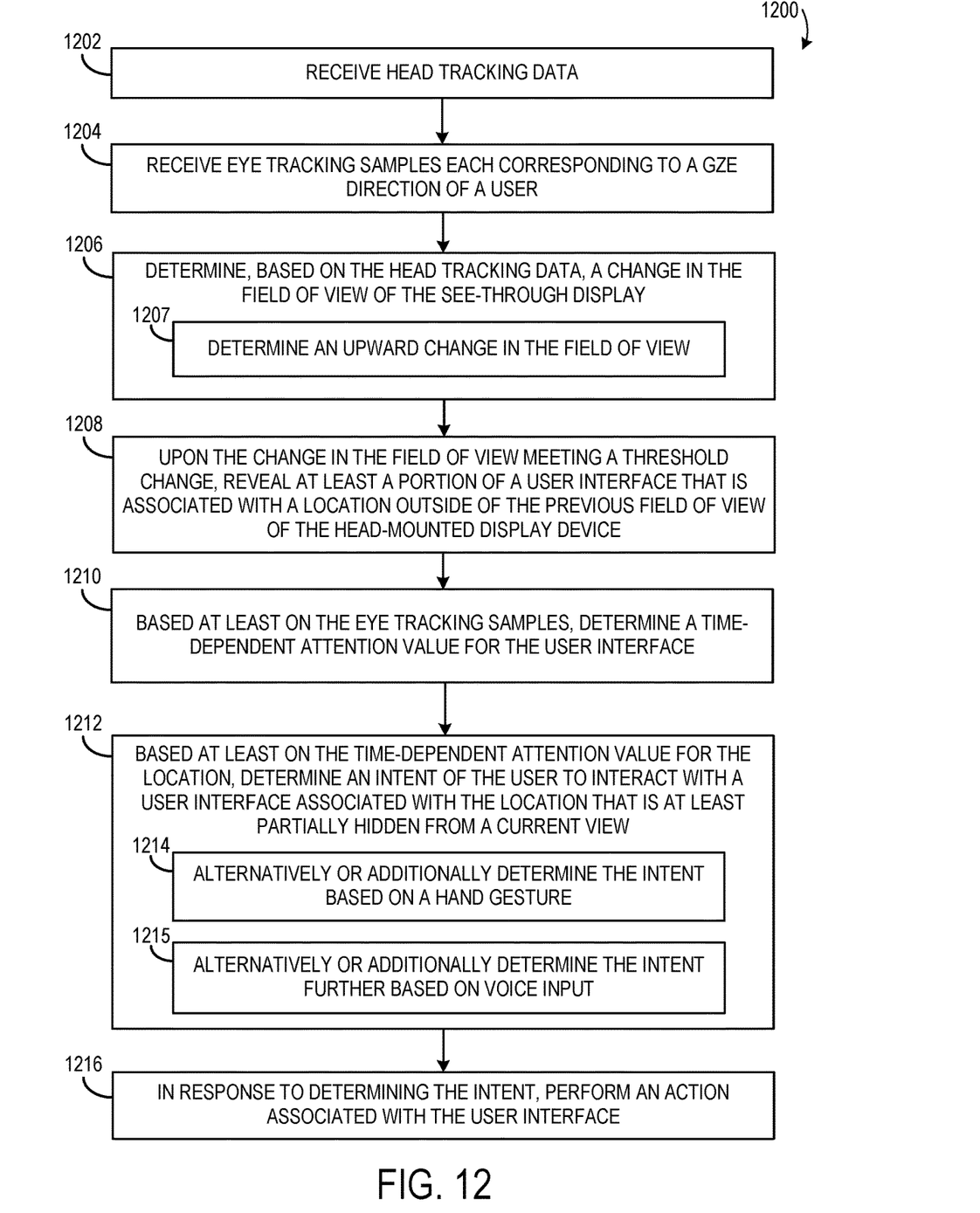
FIG. 12 shows a flow diagram depicting another example method of determining a user intent to interact with a user interface.

The above examples are described with regard to an eye-primary model, in which eye gaze is used primarily to trigger user intent. Alternatively or additionally, display device 100 may utilize a head-primary model, in which a user interface may be revealed in response to a change in a field of view of the display device. For example, when a user looks upward, a portion of a user interface may appear, as if the user interface was hovering just out of view before the user looked up. In other examples, such as in non-head-mounted mobile devices, a user interface may also be revealed in response to change in a field of view in the display based on motion and orientation data for the device. Once revealed, eye tracking as described above may be used for additional interactions. FIG. 12 shows an example method 1200 of determining a user intent to interact with a user interface based primarily on head gaze. Method 1200 includes, at 1202, receiving head tracking data from a head tracking system (e.g. IMU and/or one or more image sensors), and at 1204, receiving eye tracking samples from an eye tracking system, each eye tracking sample corresponding to a gaze direction of a user. Method 1200 further includes, at 1206, determining, based on the head tracking data, a change in the field of view of the see-through display. Here, instead of gazing at a location in the field of view to trigger display of the user interface, the user interface is hidden until the user pivots and/or translates their head to change the field of view of the display, bringing the user interface into the field of view. In some examples, the change in the field of view may be an upward change in the field of view at 1207, where the user tilts their head upward. At 1208, method 1200 includes revealing at least a portion of a user interface that is associated with a location outside of the previous field of view of the head-mounted display device.

Once the user interface is revealed, additional interaction with the user interface may be detected based on the eye tracking samples. Thus, method 1200 further includes, at 1210, based at least on the eye tracking samples, determining a time-dependent attention value for the user interface. In some examples, this may comprise determining a time-dependent attention value for each of one or more user interface elements of the user interface. Method 1200 further comprises, at 1212, determining an intent of the user to interact with the user interface based at least on the time-dependent attention value for the user interface. In various examples, the intent of the user to interact with the user interface may be alternatively or additionally based on a hand gesture 1214, and/or a voice input 1215. Method 1200 further includes, at 1216, in response to determining the intent, perform an action associated with the user interface.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
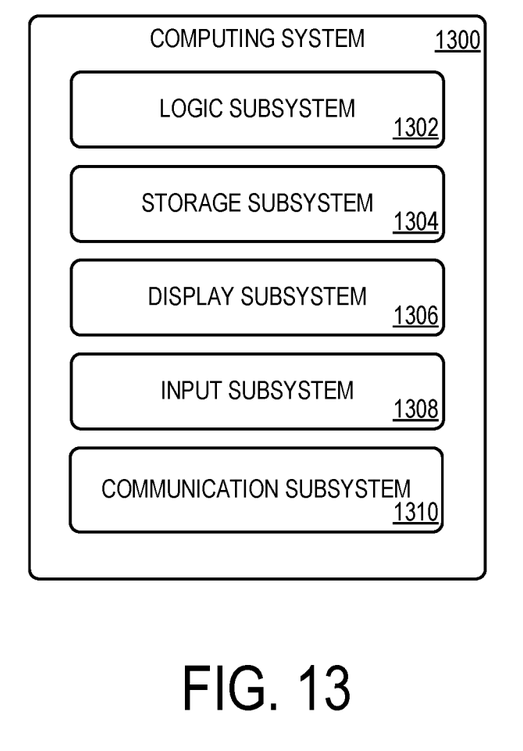
FIG. 13 shows a block diagram of an example computing system.

FIG. 13 schematically shows a non-limiting embodiment of a computing system 1300 that can enact one or more of the methods and processes described above. Computing system 1300 is shown in simplified form. Computing system 1300 may take the form of one or more personal computers, server computers, tablet computers, home-entertainment computers, network computing devices, gaming devices, mobile computing devices, mobile communication devices (e.g., smart phone), and/or other computing devices.

Computing system 1300 includes a logic subsystem 1302 and a storage subsystem 1304. Computing system 1300 may optionally include a display subsystem 1306, input subsystem 1308, communication subsystem 1310, and/or other components not shown in FIG. 13.

Logic subsystem 1302 includes one or more physical devices configured to execute instructions. For example, logic subsystem 1302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic subsystem 1302 may include one or more processors configured to execute software instructions. Additionally or alternatively, logic subsystem 1302 may include one or more hardware or firmware logic machines configured to execute hardware or firmware instructions. Processors of logic subsystem 1302 may be single-core or multi-core, and the instructions executed thereon may be configured for sequential, parallel, and/or distributed processing. Individual components of logic subsystem 1302 optionally may be distributed among two or more separate devices, which may be remotely located and/or configured for coordinated processing. Aspects of logic subsystem 1302 may be virtualized and executed by remotely accessible, networked computing devices configured in a cloud-computing configuration.

Storage subsystem 1304 includes one or more physical devices configured to hold instructions executable by logic subsystem 1302 to implement the methods and processes described herein. When such methods and processes are implemented, the state of storage subsystem 1304 may be transformed—e.g., to hold different data.

Storage subsystem 1304 may include removable and/or built-in devices. Storage subsystem 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 1304 may include volatile, nonvolatile, dynamic, static, read/write, read-only, random-access, sequential-access, location-addressable, file-addressable, and/or content-addressable devices.

It will be appreciated that storage subsystem 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 1302 and storage subsystem 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" may be used to describe an aspect of computing system 1300 implemented to perform a particular function. In some cases, a module or program may be instantiated via logic subsystem 1302 executing instructions held by storage subsystem 1304. It will be understood that different modules and/or programs may be instantiated from the same application, service, code block, object, library, routine, API, function, etc. Likewise, the same module and/or program may be instantiated by different applications, services, code blocks, objects, routines, APIs, functions, etc. The terms "module" and "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1306 may be used to present a visual representation of data held by storage subsystem 1304. This visual representation may take the form of a graphical user interface (GUI). As the herein described methods and processes change the data held by the storage machine, and thus transform the state of the storage machine, the state of display subsystem 1306 may likewise be transformed to visually represent changes in the underlying data. Display subsystem 1306 may include one or more display devices utilizing virtually any type of technology. Such display devices may be combined with logic subsystem 1302 and/or storage subsystem 1304 in a shared enclosure, or such display devices may be peripheral display devices.

When included, input subsystem 1308 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple computing system 1300 with one or more other computing devices. Communication subsystem 1310 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1300 to send and/or receive messages to and/or from other devices via a network such as the Internet.

Another example provides, a computing device comprising a see-through display, a logic subsystem, and a storage subsystem holding instructions executable by the logic machine to receive, via an eye-tracking sensor, eye tracking samples each corresponding to a gaze direction of a user, based at least on the eye tracking samples, determine a time-dependent attention value for a location in a field of view of the see-through display, based at least on the time-dependent attention value for the location, determine an intent of the user to interact with a user interface associated with the location that is at least partially hidden from a current view, in response to determining the intent, display via the see-through display the user interface. The instructions may additionally or alternatively be executable to use a leaky integrator model to determine the time-dependent attention value. The location may additionally or alternatively include a peripheral location in the field of view of the see-through display, and wherein the instructions are executable to display the user interface at the peripheral location. The user interface may additionally or alternatively include a transitional element. The instructions may additionally or alternatively be executable to receive a user input indicating an intent to interact with the transitional element, and in response, display one or more additional user interface elements via the see-through display. The instructions may additionally or alternatively be executable to update the time-dependent attention value for the location based upon additional eye tracking samples, and wherein the user input indicating the intent to interact with the transitional element is detected based upon the updated time-dependent attention value for the location. The user input indicating the intent to interact with the transitional element may additionally or alternatively include one or more of a hand gesture or a speech command. The instructions may additionally or alternatively be executable to determine the intent of the user to interact with a user interface that is at least partially hidden from a current view by comparing the time-dependent attention value to a threshold condition. The instructions may additionally or alternatively be executable to display the user interface as display-locked. The computing device may additionally or alternatively include a head-mounted display device.

Another example provides a method on a computing device, the method comprising receiving, via an eye-tracking sensor, eye tracking samples each corresponding to a gaze direction of a user, based at least on the eye tracking samples, determining a time-dependent attention value for a location in a field of view of the see-through display, based at least on the time-dependent attention value for the location, determining an intent of the user to interact with a user interface associated with the location that is at least partially hidden from a current view, and in response to determining the intent, displaying via the see-through display the user interface. The method may additionally or alternatively include using a leaky integrator model to determine the time-dependent attention value. The location may additionally or alternatively include a peripheral location in the field of view of the see-through display, and wherein the instructions are executable to display the user interface at the peripheral location. Displaying the user interface may additionally or alternatively include displaying a transitional element. The method may additionally or alternatively include receiving a user input indicating an intent to interact with the transitional element, and in response, displaying one or more additional user interface elements via the see-through display. The method may additionally or alternatively include updating the time-dependent attention value for the location based upon additional eye tracking samples, and wherein the user input indicating the intent to interact with the transitional element is detected based upon an updated time-dependent attention value for the location. The user input may additionally or alternatively include indicating the intent to interact with the transitional element further comprises one or more of a hand gesture or a speech command.

Another example provides a head-mounted display device comprising a see-through display, a head-tracking system comprising sensors configured to track a position and orientation of a head, an eye-tracking system comprising an eye tracking sensor, a logic subsystem, and a storage subsystem holding instructions executable by the logic subsystem to receive, via the head-tracking system, head tracking data, receive, via the eye-tracking sensor, eye tracking samples each corresponding to a gaze direction of a user, determine, based on the head tracking data, a change in the field of view of the see-through display, upon the change in the field of view meeting a threshold change, reveal at least a portion of a user interface that is associated with a location outside of the previous field of view of the head-mounted display device at least partially into the field of view, based at least on the eye tracking samples, determine a time-dependent attention value for the user interface, based at least on the time-dependent attention value for the user interface, determine an intent of the user to interact with the user interface, and in response to determining the intent, perform an action associated with the user interface. The instructions may additionally or alternatively be executable to determine the intent of the user to interact with the user interface further based on a hand gesture. The change in the field of view may additionally or alternatively include an upward change in the field of view.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
    a see-through display;
    a logic subsystem; and
    a storage subsystem holding instructions executable by the logic machine to:
        receive, via an eye-tracking sensor, eye tracking samples each corresponding to a gaze direction of a user,
        based at least on eye tracking samples corresponding to a location in a field of view of the see-through display, determine a time-dependent attention value for the location, the time-dependent attention value for the location increasing over time for eye tracking samples detected at the location and decaying over time for eye tracking samples detected at other locations,
        based at least on the time-dependent attention value for the location, determine an intent of the user to interact with a user interface associated with the location that is at least partially hidden from a current view, and in response to determining the intent, display via the see-through display the user interface.

2. The computing device of claim 1, wherein the instructions are executable to use a leaky integrator model to determine the time-dependent attention value.

3. The computing device of claim 1, wherein the location is a peripheral location in the field of view of the see-through display, and wherein the instructions are executable to display the user interface at the peripheral location.

4. The computing device of claim 1, wherein the user interface comprises a transitional element.

5. The computing device of claim 4, wherein the instructions are further executable to receive a user input indicating an intent to interact with the transitional element, and in response, display one or more additional user interface elements via the see-through display.

6. The computing device of claim 4, wherein the instructions are further executable to update the time-dependent attention value for the location based upon additional eye tracking samples, and wherein the user input indicating the intent to interact with the transitional element is detected based upon the updated time-dependent attention value for the location.

7. The computing device of claim 4, wherein the user input indicating the intent to interact with the transitional element further comprises one or more of a hand gesture or a speech command.

8. The computing device of claim 1, wherein the instructions executable to determine the intent of the user to interact with a user interface that is at least partially hidden from a current view comprise instructions executable to compare the time-dependent attention value to a threshold condition.

9. The computing device of claim 1, wherein the instructions are executable to display the user interface as display-locked.

10. The computing device of claim 1, wherein the computing device comprises a head-mounted display device.

11. A method on a computing device, the method comprising:

receiving, via an eye-tracking sensor, eye tracking samples each corresponding to a gaze direction of a user, based at least on eye tracking samples corresponding to a location in a field of view of a see-through display, determining a time-dependent attention value for the location, the time-dependent attention value for the location increasing over time for eye tracking samples detected at the location and decaying over time for eye tracking samples detected at other locations, based at least on the time-dependent attention value for the location, determining an intent of the user to interact with a user interface associated with the location that is at least partially hidden from a current view, and in response to determining the intent, displaying via the see-through display the user interface.

12. The method of claim 11, further comprising using a leaky integrator model to determine the time-dependent attention value.

13. The method of claim 11, wherein the location is a peripheral location in the field of view of the see-through display, and wherein the instructions are executable to display the user interface at the peripheral location.

14. The method of claim 11, wherein displaying the user interface comprises displaying a transitional element.

15. The method of claim 14, further comprising receiving a user input indicating an intent to interact with the transitional element, and in response, displaying one or more additional user interface elements via the see-through display.

16. The method of claim 14, further comprising updating the time-dependent attention value for the location based upon additional eye tracking samples, and wherein the user input indicating the intent to interact with the transitional element is detected based upon an updated time-dependent attention value for the location.

17. The method of claim 11, wherein the user input indicating the intent to interact with the transitional element further comprises one or more of a hand gesture or a speech command.

18. A head-mounted display device comprising:
a see-through display;
a head-tracking system comprising sensors configured to track a position and orientation of a head;
an eye-tracking system comprising an eye tracking sensor;
a logic subsystem; and
a storage subsystem holding instructions executable by the logic subsystem to:
receive, via the head-tracking system, head tracking data,
receive, via the eye-tracking sensor, eye tracking samples each corresponding to a gaze direction of a user,
position a user interface at a location outside of a field view of the see-through display,
determine, based on the head tracking data, a change in the field of view of the see-through display that corresponds to a head tilt toward the user interface that meets a threshold, and in response reveal at least a portion of the user interface,
based at least on eye tracking samples corresponding to the user interface, determine a time-dependent attention value for the user interface, the time-dependent attention value for the user interface increasing over time for eye tracking samples detected at the user interface and decaying over time for eye tracking samples detected at other locations,
based at least on the time-dependent attention value for the user interface, determine an intent of the user to interact with the user interface, and
in response to determining the intent, perform an action associated with the user interface.

19. The head-mounted display device of claim 18, wherein the instructions are executable to determine the intent of the user to interact with the user interface further based on a hand gesture.

20. The head-mounted display device of claim 18, wherein the change in the field of view comprises an upward change in the field of view.

* * * * *